United States Patent [19]

Gallup et al.

[11] Patent Number: 5,190,664
[45] Date of Patent: Mar. 2, 1993

[54] BRINE HEAT EXCHANGER TREATMENT METHOD

[75] Inventors: Darrell L. Gallup, Chino Hills, Calif.; Michael L. Barnes, Pasay, Philippines; Douglas Cope, Pasay, Philippines; Quirino S. Kolimlim, Pasay, Philippines; John K. Leong, Bakersfield, Calif.

[73] Assignee: Union Oil Company of California, Los Angeles, Calif.

[21] Appl. No.: 607,263

[22] Filed: Oct. 31, 1990

Related U.S. Application Data

[63] Continuation-in-part of Ser. No. 322,681, Mar. 13, 1989, Pat. No. 5,073,270, which is a continuation of Ser. No. 590,016, Mar. 15, 1984, abandoned, which is a continuation of Ser. No. 566,714, Dec. 27, 1983, Pat. No. 4,756,888.

[51] Int. Cl.$^5$ .............................. C02F 5/08
[52] U.S. Cl. .................. 210/696; 60/641.2; 60/641.5; 166/300; 166/310; 210/698; 210/743; 210/747
[58] Field of Search ............ 60/641.2, 641.5; 210/696–698, 747, 743; 252/8.552; 166/300, 310

[56] References Cited

U.S. PATENT DOCUMENTS

| | | | |
|---|---|---|---|
| 3,639,278 | 2/1972 | Hwa | 252/180 X |
| 3,639,279 | 2/1972 | Gardner et al. | 252/8.55 B |
| 3,769,208 | 10/1973 | Cook et al. | 210/696 |
| 4,054,175 | 10/1977 | Swearingen | 210/696 |
| 4,328,106 | 5/1982 | Harrar et al. | 210/700 |
| 4,500,434 | 2/1985 | Jost et al. | 210/696 |
| 4,517,097 | 5/1985 | Merrill, Jr. | 210/696 |
| 4,537,684 | 8/1985 | Gallup et al. | 210/696 |
| 4,830,766 | 5/1989 | Gallup et al. | 210/757 |
| 4,978,457 | 12/1990 | Gallup et al. | 210/747 |

FOREIGN PATENT DOCUMENTS 0590986 1/1960 Canada ............................. 210/696

OTHER PUBLICATIONS

Bowen and Groh, Chapter 7 entitled "Geothermal Energy" of Energy Technology Handbook, by Considine, 1977, p. 7–4.

J. Z. Grens, et al., "Field Evacuation Scale Control Methods Acidification," Lawrence Livermore Labs, Geothermal Resources Council Transactions, vol. 1, May 1977.

Primary Examiner—Peter Hruskoci
Attorney, Agent, or Firm—Gregory F. Wirzbicki; William O. Jacobson

[57] ABSTRACT

A method for controlling fouling of a heat exchange surface exposed to a high-enthalpy geothermal brine tending to form silica scale, but containing less than a saturated amount of cations capable of reacting with sulfates. The method adds a limited amount of sulfuric acid to the brine to form a mixture. The amount of sulfuric acid is limited to that required to produce sulfates sufficient to apparently complex with silica, but less than the amount required to increased the sulfates to above saturation amounts of sulfate reacting cations, significantly reducing or virtually eliminating sulfate and silica deposits and fouling. The addition is further controlled to an amount which reduces the pH of the mixture to no less than about 4.5. The addition does not significantly increase corrosion rates of mild steel heat exchanger materials of construction.

20 Claims, 1 Drawing Sheet

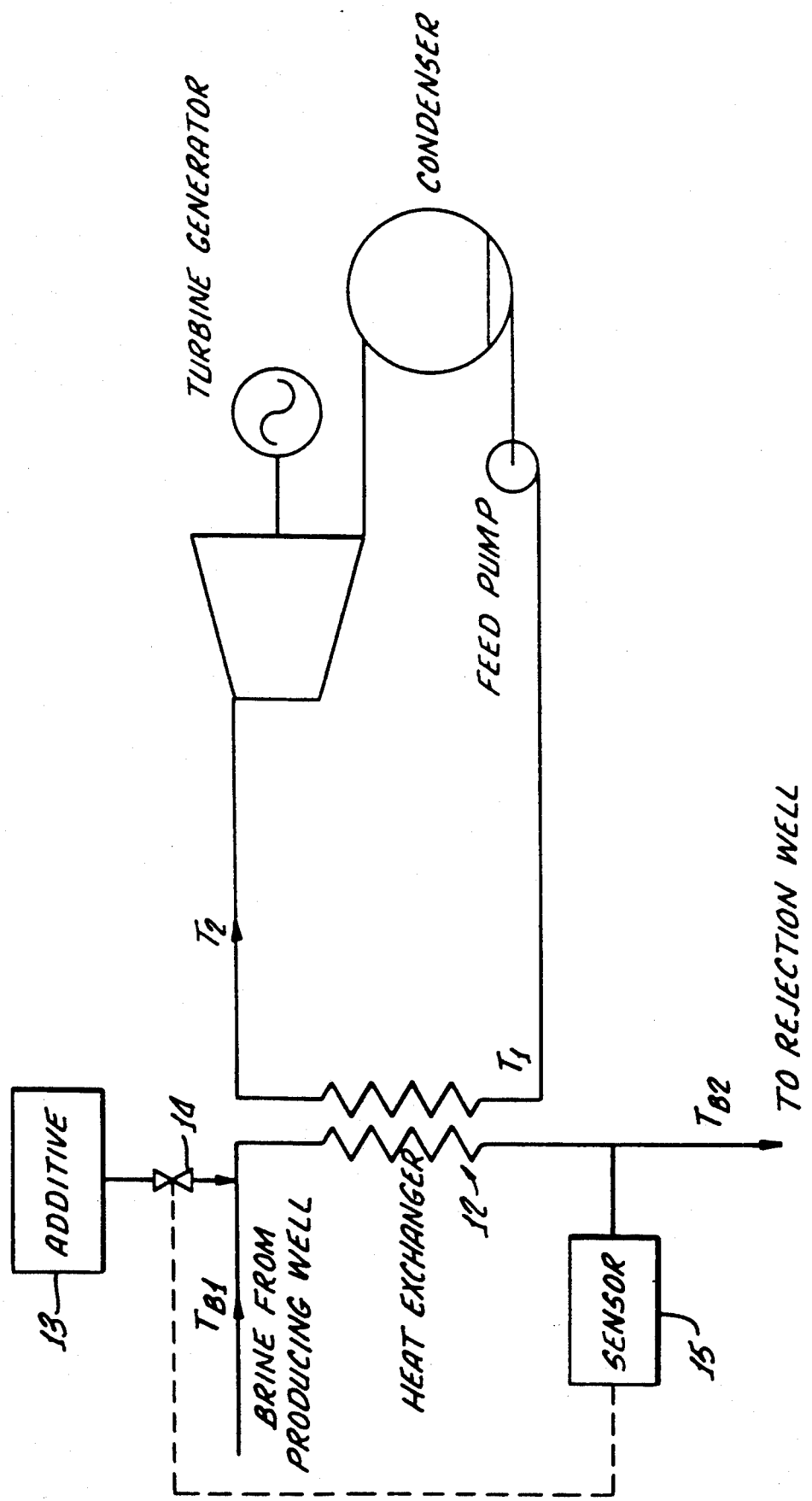

BRINE HEAT EXCHANGER TREATMENT METHOD

CLAIM OF PRIORITY, INCORPORATION BY REFERENCE

This application is a continuation in part of: (1) application Ser. No. 07/322,681 filed on Mar. 13, 1989 now U.S. Pat. No. 5,073,270, which is a continuation of application Ser. No. 06/590,016 filed on Mar. 15, 1984 now abandoned, which in turn is a continuation of application Ser. No. 06/566,714 filed on Dec. 27, 1983 now U.S. Pat. No. 4,756,888. All of these prior filed applications are incorporated in their entirety herein by reference.

FIELD OF THE INVENTION

This invention relates to the treatment of a hot aqueous brine solution from a geothermal reservoir. The brine contains various dissolved components which may have scaling and corrosive tendencies. More particularly, the invention relates to a treatment of a high-enthalpy geothermal brine having less than a saturated concentration of cations and sulfates that will produce a precipitate, and from which brine heat is transferred across a solid surface, cooling the brine. The cooled brine is then typically injected back into the geothermal reservoir.

BACKGROUND

The solubility of most ions in solution decreases with a decrease in solution temperature. If dissolved ions are present near their saturation concentration in the solution, a significant reduction in the temperature of the system can result in supersaturation and precipitation of a portion of these supersaturated ions. Precipitates can combine and deposit as a scale on any solid surface with which they come into contact, such as the vessel or conduit in which the solution is confined.

One example of such a solution are certain high-enthalpy or high temperature liquids produced from a geothermal well, i.e., a high temperature geothermal brine from a liquid-dominated reservoir. As discussed by Bowen and Groh ("Energy Technology Handbook," D. M. Considine, Editor, at page 7-4 of Chapter 7 entitled "Geothermal Energy"), liquid-dominated reservoirs may be conveniently divided into two types: one type having high-enthalpy fluids above 200 calories/gram; and one having low-enthalpy fluids below this point. High temperature type brines have been defined by in-situ reservoir temperatures, the high temperature type having in-situ temperatures generally above 180° C., typically above 200° C., most commonly above 220° C., and the low temperature type having temperatures below these values. The high temperature or high-enthalpy brines especially tend to dissolve reservoir rock or contacting solids and these brine types contain dissolved solids in concentrations ranging from around 2,000 to as much as 260,000 ppm by weight.

An especially troublesome dissolved solid component of the high-enthalpy brine is silicon, which may be found at or near saturation concentrations in the form of silicic acid oligomers. These tend to precipitate out at almost every stage of brine processing as the temperature is lowered, either as substantially pure silica or as a tightly adherent metal-silica/metal-silicate scale. Unless inhibited, naturally occurring silica-rich scale/precipitation (as the brine is cooled) must be removed frequently. This precipitation tendency and removal need is especially true as lower brine temperatures are reached during the cooling process.

In order to extract thermal energy from a liquid geothermal brine, the brine temperature is reduced. Heat exchangers are commonly used for low-enthalpy brine applications, such as producing hot water. The brine's thermal energy is transferred within the heat exchangers to the hot water. The heated water may in turn heat air (for space heating) or other fluids. Even though the low enthalpy brines may be saturated with dissolved solids, the limited amount of temperature reduction possible for these low-enthalpy (i.e., moderate temperature) brines produces little or no precipitation and fouling of heat exchange surfaces or plugging of injection wells. This lack of significant precipitation or fouling is also believed due to the relative stability of slightly supersaturated brines. Even if the supersaturated brine is not stable, the low precipitation rates (i.e., slow precipitation kinetics) at the moderate brine temperatures within these heat exchangers are also believed to inhibit large amounts of precipitation and fouling.

However, high-enthalpy or high temperature brines typically have larger saturation concentrations of dissolved solids and faster precipitation kinetics. Larger amounts of heat removal can also produce significant levels of supersaturation. High enthalpy brines therefore tend to produce copious quantities of scale which would quickly foul a conventional heat exchanger. Thus, conventional heat exchangers are not generally employed for high-enthalpy brines, even though extraction of heat from such brines using a heat exchanger process may otherwise be beneficial.

Other methods for extracting energy from high-enthalpy brines are commonly used because of conventional heat exchanger fouling. One such method is flashing, which is accomplished in a vessel where brine pressure is reduced. As a result, a portion of the brine is flashed to steam and other gases while the temperature of the residual brine is decreased. Flashing is often accompanied by massive amounts of precipitation formation that may scale and eventually plug piping. Other processes which avoid a fouled heat transfer surface, such as total flow and direct-contact (fluid-to-fluid) heat exchange processes, have also been proposed for high-enthalpy brines.

Because of massive scaling, various proposals have been made to decrease the scale formation in flash or other non-heat exchange surface equipment used in producing and handling high-enthalpy geothermal brines. In "Field Evaluation of Scale Control Methods: Acidification," by J. Z. Grens et al, Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica appeared to promote the adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was dramatically reduced or eliminated.

However, such acidification, especially at a pH near 1.5, tends to significantly increase the corrosion of the brine-handling equipment. If a heat exchanger were to be used to handle strongly acidified brines, added wall thickness or excessively costly materials of construction would be required. If added wall thickness heat exchangers are used, frequent removal of corrosion products from the heat exchange surfaces may also be required.

Still further, strong acid treatments can cause other geothermal fluid handling problems. These can include the introduction of oxygen into the otherwise oxygen-free brine, embrittlement of equipment, and injection formation problems. Thus, commercial acid treatments of geothermal brines known to the inventors are limited to small changes in pH. This accepts the residual amount (not the complete elimination) of scale, especially silica, deposited on flash process equipment in return for acceptable corrosion rates and significant reductions in scaling rates. Reducing scale formation decreases the amount of scale removal, but deposits would still quickly foul a heat exchange surface making a heat exchange process impractical without very frequent cleaning.

While the aforementioned acidified geothermal brine and acidified brine plus reducing agent treatments have met with some success in some non-heat exchanger surface applications, the need exists for a further improved treating process to further decrease fouling of a heat exchanger. Controlling fouling tendencies in materials commonly used in heat exchangers without significant added cost would allow economic energy extraction from some high-enthalpy brines. The economic advantages of being able to extract energy in a heat exchange process is especially beneficial when the high enthalpy or high temperature brines contain high dissolved gas contents, avoiding the need for costly non-condensible gas removal equipment normally required for a condensing flash process.

Accordingly, it is an object of this invention to provide an improved method for decreasing or virtually eliminating the overall precipitation and scaling of these brines, particularly silica and iron-silicate scale, so as to prevent significant fouling of heat exchanger surfaces. It is also an objective of this invention to control corrosion of heat exchanger surfaces composed of common used materials of construction, such as low carbon steels.

Other objects, advantages and features of the invention will be apparent from the following description, drawings and appended claims.

SUMMARY OF THE INVENTION

In view of the foregoing, the prior art has chosen to extract energy from high enthalpy brines by passing them through a flash vessel as opposed to a heat exchanger. The primary reason for avoiding the option to extract heat in a heat exchanger is the very rapid precipitation and fouling of heat exchange surfaces. Even when precipitation is inhibited by prior art methods, uneconomic removal of remaining precipitation and fouling or costly materials of construction are required.

The present invention aims to overcome this problem, provide a process for passing the high enthalpy brines through heat exchangers with substantially decreased fouling—and thus gain the advantage that heat exchange processes have over flashing operations for some brines. In particular, for high enthalpy brines having high non-condensible gas contents, all other things being equal, a heat exchange process has significant advantages over a flash process, such as avoiding removal of flashed non-condensible gases from flashed steam or condensate. Avoiding flashing of non-condensible gases such as $H_2S$ may also avoid severe corrosion and environmental abatement costs.

The present invention provides a method for decreasing or virtually eliminating the fouling of a heat exchange surface by the deposition of iron silicate and other scales from a high-enthalpy or high temperature geothermal brine having less than a saturated concentration of cations and sulfates that will produce a sulfate containing precipitate. Sulfuric acid is added to these low cation-containing brines only in amounts needed to virtually eliminate silica and sulfate scales and which only slightly lowers the pH so that corrosion rates are not significantly increased. This virtual elimination and no significant increase in corrosion allows low carbon steel heat exchangers to be used. This method essentially eliminates the formation of silica scale in these brines without a large amount or multiple additives, minimizing cost.

In the present invention, the high-enthalpy geothermal brine feed to a heat exchanger (in a binary energy extraction process) contains less than saturated concentrations of calcium, barium, and other cations capable of reacting with sulfates, and the brine is preferably at a pressure sufficient to maintain the brine as a liquid, e.g., above typical separator or flash pressures. In addition to significant concentration of trivalent metal ions (especially those of iron and manganese) and silica species dissolved or suspended therein, the brine also typically contains dissolved non-condensible gases. Maintaining brine pressure during thermal energy extraction will also retain the dissolved gases. The brine is acidified by pressurizing, injecting, and mixing a water-soluble sulfate-producing acid in amounts limited to that which will not significantly exceed saturation levels of sulfate compounds in the brine (avoiding sulfate precipitation) while lowering a feed brine to not less than about 4.5 at the binary process temperatures. The acid is typically added in an amount sufficient to lower the pH of the acidified brine mixture between about 0.1 and about 0.5 pH units.

BRIEF DESCRIPTION OF THE DRAWINGS

FIG. 1 shows a schematic of a geothermal binary process with fouling control acid addition.

DETAILED DESCRIPTION OF THE INVENTION

FIG. 1 shows a schematic of a binary process with a single-scale control additive for low sulfate-reacting cation geothermal brine. Single additive is preferably $H_2SO_4$. Examples of low sulfate-reacting cation, high-enthalpy brines are found in Bulalo and Tiwi, in the Philippines.

Based upon laboratory results and literature studies, heat exchanger fouling rates after $H_2SO_4$ treatment in accordance with the invention will be acceptable, i.e., compatible with conventional binary heat exchange process equipment for some high-enthalpy brines. The single additive appears to simultaneously lower pH (dissolving or controlling some scaling tendencies) and also supply sulfate anions to inhibit other scale forming materials such as silica, but in amounts which avoid sulfate supersaturation and undue corrosion. Although other agents can be added with $H_2SO_4$, such as HCl, acetic, and nitric acids, only a sulfate-producing acid is preferred.

As shown schematically in FIG. 1, high enthalpy brine is supplied from a producing geothermal well. The feed brine may be a single phase liquid or gas stream, but may also be a two phase mixture. The heat is extracted from the brine at a heat exchanger 12. The heat exchanger is shown schematically as a counterflow heat exchanger, but cross-flow or other types of heat exchangers may be used. After heat is transferred to a binary or working fluid which reaches a maximum temperature $T_1$, the cooled brine is injected into a rejection (i.e. injection) well.

The process feed stream or brine from the producing well is typically supplied at elevated temperature $T_{B1}$ and pressure conditions from a source geothermal production well tapping a high enthalpy geothermal reservoir. The feed brine may be pumped into the binary heat exchanger 12, but if the production well is self-flowing, pumping may not be required. Heat exchanger feed brine temperature $T_{B1}$ typically ranges from 180° to 300° C., preferably at least 120° C., and most preferably at least 175° C. Feed brine pressure typically ranges from 896 kPa to 6,984 kPa (130 to 1,000 psig), preferably no less than 69 kPa (10 psig), and most preferably no less than 793 kPa (115 psig). Heat exchanger brine outlet temperature $T_{B2}$ typically ranges from 75° C. to 151° C. Total change in brine temperature across the heat exchanger 12 ($T_{B1}-T_{B2}$, or delta $T_B$) for high enthalpy brines typically ranges from 30° C. to 225° C., but preferably a delta $T_B$ of at least 100° C. is desired to economically use the high enthalpy brines. The non-condensible gas concentration in the feed brine is theoretically unlimited, but brines having a non-condensible gas content of at least 0.1 percent by weight and especially those feed brines having a non-condensible gas content of more than 1.0 percent by weight are typically more efficiently utilized. Typical non-condensible gases include $CO_2$ and $H_2S$.

The binary or working fluid on the other side of the heat exchanger surface of heat exchanger 12 flows in a closed loop. From an initial temperature $T_1$, the binary fluid is heated (by exchanging heat within heat exchanger 12) to a temperature $T_2$. The heated binary fluid drives a turbine generator, is condensed in a condenser and is finally re-pressurized by a feed pump prior to starting around the closed loop again.

The location of additive 13 addition and mixing with the brine is shown near the entry to heat exchanger 12, but may also be placed at other locations. Another possible location is at the production well downhole, similar to that shown on FIG. 1. Control of the amount of additive mixed with the brine is provided by valve (or metering pump) 14, which is controlled by sensor 15. Sensor 15 may detect dissolved sulfate, one or more sulfate-reacting cations and/or pH of the mixture. The sensor produces a control signal to control means 14 based upon these measured parameters. Other control parameters and locations for the sensor 15 are also possible.

The preferred process steps of using the fouling control additive apparatus require the sulfate reacting cations and pH of the feed brine to be estimated or measured at feed brine temperature and pressure conditions (e.g., at $T_{B1}$) Because of these elevated conditions and ongoing reactions, measurements may require the use of on-line measurement devices or sampling followed by stabilization and measurement. The feed brine pH typically is in the range of from 5.5 to 8.5 units, preferably in the range of from 6.0 to 8.0 units, and most preferably in the range of from 6.5 to 7.5 units.

The concentration of sulfate(s) and sulfate-reactable cation(s) in the feed brine may be directly measured or estimated based upon the predominant sulfate-forming cation species, such as calcium and barium. These cations are typically found in high-enthalpy brines as sulfate salt precipitate. In addition to Ba and Ca, other cations which can react to form sulfate precipitates when exposed to sulfate anions, i.e., sulfate-reacting cations, including strontium, radium, silver and lead. One can also measure the total sulfur concentration in order to estimate $SO_4$ if other sulfur containing compounds, such as $H_2S$, are absent.

The amount of sulfate(s), including sulfate salts, in the feed brine must not exceed saturation levels at process conditions. Preferably, the amount of sulfates should be less than feed brine saturation levels so that the temperature reduction and addition of a sulfate-forming additive does not cause a large sulfate supersaturation and sulfate scale, more preferably, sulfate quantity should be less than sulfate saturation levels at discharged (or cooled) brine conditions, $T_1$. Most preferably, estimated sulfate concentrations should be no more than 50 percent of saturation amounts at feed brine conditions and/or no more than 90 percent of saturation amounts at discharge brine conditions.

If measurement of calcium cations are used in place of total sulfate measurements, measured calcium concentrations should be less than 100 ppmw, most preferably less than 60 ppmw in high-enthalpy feed geothermal brines at a temperature of approximately 177° C. (350° F., such as found at Bulalo. If measurement of barium cations are used in place of total sulfate measurements, measured barium concentrations should be less than 15 ppmw, most preferably less than 10 ppmw in high-enthalpy feed geothermal brines at a temperature of approximately 177° C. (350° F.), such as found at Bulalo. The total of sulfate cations in the feed brine should be less than 250 ppmw, most preferably less than 145 ppmw if total cation measurements are used in place of total sulfate measurements.

The heat exchanger 12 can be of various designs, the preferred being a shell-and-tube heat exchanger. Prior use of this type of heat exchanger for low-enthalpy geothermal fluids places the geothermal fluid on the tube side, so that fouling deposits can be more easily cleaned out, for example with traveling plugs or steam lances. Although flowing brine on the tube side is preferred, treated geothermal brines can now be used on the shell side of this type of heat exchanger because of the virtual elimination of scale and fouling deposits. The heat exchanger can be composed of a low alloy steel or other conventional materials.

The binary or working fluid is preferably a hydrocarbon fluid, such as isobutane or an isobutane mixture. The binary fluid can be selected to optimize cycle efficiency at brine inlet $T_{B1}$ and brine outlet $T_{B2}$ conditions.

The means for introducing the sulfuric acid to the brine flow can also vary. The preferred embodiment is an acid metering pump, controlled by a sensor and measuring device 15, such as pH measurements of the downstream brine/acid mixture, where pH has a generally known or assumed relationship to sulfate content. However, control of the amount of acid may also be based upon the measured amounts of silicious material as well as sulfates in the brine flow. These measured values, along with temperature and other data, can be used to calculate saturation concentrations of sulfates (at brine conditions from inlet to heat exchanger discharge) and the otherwise expected amount of silica precipitation. The acid injection pump rate can then be selected to mix a rate of acid that will be sufficient to react with a majority of the silica in the brine flow to form silica-sulfate complex without exceeding sulfate saturation amounts or lowering the pH to less than about 4.5 to 5.5 units.

The invention satisfies the need to virtually eliminate scaling and significant fouling in low sulfate, high-enthalpy brines without drastic reductions in pH (and associated corrosion problems) or adding another agent in conjunction with a more moderate acid addition. A single addition of sulfuric acid lowers the pH of the mixture and provides sulfate anions which apparently complex with the silica at these lowered pH values. The invention allows binary heat exchangers composed of commonly available materials to be used with high-enthalpy brines. This can be especially cost effective for brines having significant amounts of dissolved non-condensable gases which would require uneconomic gas removal equipment and operations in a flash process.

Although the exact mechanism of inhibiting scale and fouling is unknown and the claims hereinafter set forth are in no way limited by the chemical reactions involved in deposition, it is believed that the acid supplies sulfates to complex with the scale forming silica and the associated moderate decrease in pH further decreases the kinetics of silica precipitation. Whether the silica is held in the form of colloidal particles or other forms is not known. Sulfate containing scale control is thought to be the direct result of limiting the process to high-enthalpy or high temperature feed brines having less than a saturated concentration of cations and sulfates that will produce a sulfate containing precipitate.

Further advantages of the invention include: operating cost (since sulfuric acid is currently less expensive than an equivalent amount of HCl), capital cost (since only one additive system is needed), and reliability (since single additive avoids complications due to controlling ratios of additives).

Still other alternative applications are possible. These include: a process incorporating both flash and binary heat extraction equipment (e.g., feed brine is first flashed to produce steam and concentrated brine which is then cooled in a binary heat exchanger); combining binary and flash steps in a single vessel (e.g., placing heat exchanger tubes near the bottom of a flash vessel, using the flashed brine on the shell side to heat a binary fluid within the tubes); a series of binary heat exchangers and heat exchange process steps (e.g., regenerative heating of a binary fluid followed by geothermal brine heating); and the use of several different binary working fluids. Alternative process steps include: agitating or mixing the additive and brine mixture after addition; treating only a portion of the brine feed (e.g., treating a boundary layer of the brine which is proximate to heat exchange surfaces); controlling the heat exchanger brine temperature change, delta $T_b$, such that significant sulfate supersaturation is avoided at the brine heat exchanger outlet; and adding another non-sulfate producing acid (e.g., if added acid is required to lower mixture pH but the mixture's sulfate content is approaching saturated values).

The invention is further described by the following example which is illustrative of a specific mode of practicing the invention and is not intended as limiting the scope of the invention as defined by the appended claims. The example is based upon data from brines found at a geothermal reservoir near Bulalo, in the Philippines.

EXAMPLE

Representative properties and composition data for samples of Bulalo brines is shown in Table 1. "Mixture" data are the expected values after approximately 25 ppm $H_2SO_4$ is mixed with the feed brine at the temperature listed. All ppm or ppt data are given by weight. "Discharge" data are the expected values after heat is extracted from the brine mixture in a conventional heat exchanger.

TABLE 1

| BULALO BRINE COMPOSITION AND PROPERTIES | | | |
|---|---|---|---|
| COMPOSITION/PROPERTY | FEED | MIX-TURE | DIS-CHARGE |
| Temperature, °C. (°F.) | 185(365) | 185 (365) | 150(302) |
| Pressure, atm. | 140 | 140 | 140 |
| pH, units | 6.4 | 5.0 | 5.0 |
| Silica, ppm. | 690 | 690 | 690 |
| Calcium, ppm. | 33 | 33 | 33 |
| Barium, ppm. | <1 | <1 | <1 |
| Strontium, ppm. | <1 | <1 | <1 |
| Radium, ppt. | <1 | <1 | <1 |
| Total sulfates, ppm. | 20 | 45 | 45 |
| Sulfate saturation, ppm. | 250 | 250 | 292 |

Note:
Anhydrite ($CaSO_4$) precipitate exhibits retrograde solubility and sulfate saturation at discharge conditions assumes insufficient Ba to form $BaSO_4$.

Results are expected to show heat exchanger scaling rates of less than 35 mils/year when exposed to the brine $H_2SO_4$ mixture of Table 1. This compares to an expected scaling rate value of as much as 1,000 mils/year without any acid addition and approximately 50 mils/year after exposure to brines comparably treated with HCl to decrease the pH from approximately 5.5 to approximately 5.0. Corrosion rates with and without acid addition are expected to be relatively low for these brines.

The results in this comparison example show that the primary scale inhibiting effect to be the pH reduction, rather than the sulfate formation properties of the $H_2SO_4$ addition. However, pH reduction may be limited for other handling systems and brines having different corrosion rates and cation compositions, where the contribution of sulfate complexing may be the predominant inhibiting effect.

Comparison of expected scale compositions is summarized in Table 2. Again, the predominant scale composition effect of $H_2SO_4$ addition is expected to result from the pH decrease for these brines. However, the additional effect upon scale composition of using $H_2SO_4$ rather than other non-sulfate producing acids is expected to be more pronounced when treating brines having other compositions or limited to a different decrease in pH.

TABLE 2

| COMPOSITION | EXPECTED SCALE COMPOSITION | |
|---|---|---|
| | H$_2$SO$_4$ MIXTURE | HCl MIXTURE |
| Hydrated Silica, % | 80 | 82 |
| Calcium, ppm. | 2400 | 2400 |
| Barium, ppm. | <1 | <1 |
| Strontium, ppm. | <1 | <1 |
| Radium, ppt. | <1 | <1 |
| Iron, ppm. | >25,000 | 25,000 |

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for virtually eliminating a silicon-containing precipitate from a high-enthalpy geothermal brine having an initial temperature and containing one or more cations capable of forming a sulfate salt and containing less than a saturated amount of said sulfate salt to produce a sulfate precipitate at a final temperature lower than said initial temperature, which brine tends to form said precipitate when thermal energy is removed from said brine and said initial temperature is reduced to said final temperature in a process in which thermal energy is transferred across a solid surface in contact with said brine, which method comprises:
    adding an amount of sulfate-producing acid to said brine to form a brine-acid mixture and substantially eliminate said silicon-containing precipitate;
    controlling the amount of said added acid based upon said less than saturated amount of sulfate salt;
    flowing said brine-acid mixture in contact with said solid surface after said controlling step; and
    wherein said brine-acid mixture does not produce a substantial amount of said silicon-containing precipitate and said sulfate precipitate after said flowing.

2. The method of claim 1 wherein said brine has a pH greater than 5.0 and wherein said controlling step also results in said mixture having a pH of no less than about 4.5 units.

3. The method of claim 2 which also comprises the steps of
    measuring the concentration of said cations dissolved in said brine; and
    measuring the amount of said cations in said mixture after said flowing step.

4. The method of claim 3 which also comprises the measuring the pH of said brine prior to said adding step; and
    measuring the pH of said mixture after said flowing step.

5. The method of claim 4 which also comprises the steps of:
    measuring the temperature of said mixture; and
    calculating the saturated amounts of said cations at about said measured temperature.

6. A method for controlling the silica precipitate fouling of a solid, heat exchange surface when exposed to a high-enthalpy geothermal fluid having less than a saturated concentration of a cation and sulfate that will produce a sulfate containing precipitate after said enthalpy is decreased, said method comprising:
    adding an amount of a sulfate-producing acid to said geothermal fluid to create a fluid mixture wherein said acid amount is sufficient to control said fouling and insufficient to produce said sulfate containing precipitate; and
    flowing said fluid mixture in contact with said heat exchange surface.

7. The method of claim 6 which also comprises:
    measuring the concentration of said cation dissolved in said geothermal fluid;
    estimating the saturated concentration of said cation as a sulfate in said geothermal fluid;
    measuring the pH of said geothermal fluid; and
    controlling the added amount of said acid to prevent the formation of substantial amounts of said sulfate containing precipitate.

8. The method of claim 7 wherein said acid comprises a water soluble mixture containing sulfuric acid and an acid selected from the group consisting of hydrochloric acid, acetic acid, and nitric acid and combinations thereof.

9. The method of claim 8 wherein said amount is sufficient to lower the pH of said mixture to within the range from 4.5 to 5.5.

10. The method of claim 7 wherein said sulfate producing acid is a water soluble sulfuric acid in the absence of substantial amounts of other acids.

11. A method for treating a high-enthalpy geothermal brine which tends to form a silica containing precipitate, which method virtually eliminates said precipitate and comprises:
    adding to said brine a sulfate-containing material having a pH of less than 5.0 to substantially eliminate said precipitate;
    mixing said material and brine to form a mixture containing one or more sulfate containing compositions, each of said compositions in an amount less than a saturated amount to produce a sulfate precipitate; and removing thermal energy from said mixture without producing a substantial amount of said silica containing precipitate and said sulfate precipitate wherein the majority of said thermal energy is removed across a solid surface in thermal contact with said mixture.

12. The method of claim 11 which also comprises the step of injecting said mixture into a subsurface reservoir after said thermal energy removal step.

13. A method of making a fluid mixture containing a high-enthalpy geothermal brine tending to form a silica precipitate suitable for use in a heat exchanger without substantial fouling of said heat exchanger, said method comprising:
    adding to said brine a sulfate-containing material having a pH of less than 5.0 to control the formation of said silica precipitate;
    mixing said material and brine to form a mixture containing an amount of one or more sulfate-containing compositions, each in an amount less than a saturated amount to produce a sulfate precipitate after transferring thermal energy from said mixture; and
    transferring thermal energy from said mixture across said heat exchange surface to another fluid without producing a substantial amount of said silica precipitate and said sulfate precipitate.

14. The method of claim 13 wherein the mixture is at a pressure of no less than 10 psig and wherein said adding step comprises controlling the material added so that each of said composition amounts are less than a saturated amount after said transferring step.

15. The method of claim 14 wherein said transferring step is also controlled so that each of said composition amounts are less than a saturated amount after said transferring step.

16. The method of claim 15 wherein said adding step also comprises adding a non-sulfate containing acid.

17. The method of claim 16 which also comprises the step of flashing a portion of said brine leaving a remaining liquid portion after flashing, wherein said flashing occurs before said material is added to the remaining liquid portion of said brine.

18. A method for treating a high temperature geothermal brine comprising water, silicon tending to form a silica containing scale, at least 0.1 percent by weight of one or more non-condensible gases, and one or more cations capable of reacting with sulfate anions and forming a sulfate precipitate, wherein said brine has less than a saturated concentration of said cations and anions to produce said sulfate precipitate, said method comprising adding $H_2SO_4$ to said brine in an amount sufficient to prevent substantial amounts of said scale without forming substantial amounts of said sulfate precipitate.

19. The method of claim 18 wherein said sulfate forms a complex with said silica and said added amount is also controlled so as to not substantially increase the corrosion rate of devices in contact with said brine.

20. The method of claim 19 wherein said brine is at a pressure which maintains said non-condensible gas generally dissolved in said brine and said brine comprises at least 1.0 percent by weight of one of more said non-condensible gases and wherein said non-condensible gases comprise $CO_2$ and $H_2S$.

* * * * *